United States Patent

Yasuda et al.

[15] 3,675,496

[45] July 11, 1972

[54] CHANNEL SELECTING DEVICE

[72] Inventors: Atsuhiro Yasuda, Kawasaki; Koichi Kobayashi, Yokohama, both of Japan

[73] Assignee: Tokyo Shibaura Electric Co., Ltd., Kawasaki-shi, Japan

[22] Filed: Aug. 25, 1970

[21] Appl. No.: 66,827

[30] Foreign Application Priority Data

Aug. 26, 1969 Japan ....................44/80497
March 10, 1970 Japan ....................44/22710

[52] U.S. Cl. ....................74/10.6, 74/10.15, 334/7
[51] Int. Cl. ....................F16h 35/18
[58] Field of Search ....................74/10.6, 10.54, 10.15, 10

[56] References Cited

UNITED STATES PATENTS

| | | | |
|---|---|---|---|
| 2,521,968 | 9/1950 | De Tar et al. | 74/10.15 UX |
| 2,839,936 | 6/1958 | Dawson | 74/10.54 |
| 3,459,055 | 8/1969 | Sperber | 74/10.6 |
| 3,555,914 | 1/1971 | Mase | 74/10.6 |

*Primary Examiner*—Milton Kaufman
*Attorney*—Kemon, Palmer & Estabrook

[57] ABSTRACT

A channel selecting device for UHF television channels comprises a channel selecting shaft, a channel selecting cylinder axially slidably mounted on the channel selecting shaft and having a helical cam surface on one side, means for stepwisely rotating the channel selecting shaft and channel selecting cylinder, a plurality of circumferentially and equally spaced apart fine tuning screws, fine tuning means for selectively operating one of the screws to move it in the axial direction in accordance with the axial movement of the selectively operated fine tuning screw and with the circumferential displacement of the helical cam surface and channel selector operating means normally urged against one side surface of the channel selecting cylinder to follow the axial movement thereof.

13 Claims, 11 Drawing Figures

INVENTOR.
Atsuhiro Yasuda
Koichi Kobayashi
BY
Kemon, Palmer & Estabrook
Attorneys INVENTOR.
Atsuhiro Yasuda
Koichi Kobayashi
BY
Kemon, Palmer & Estabrook
Attorneys INVENTOR.
Atsuhiro Yasuda
Koichi Kobayashi
BY
Kemon, Palmer & Estabrook
attorneys

CHANNEL SELECTING DEVICE

BACKGROUND OF THE INVENTION

This invention relates to a channel selecting device and more particularly to a multi-channel selecting device which may be employed in an UHF television receiving set in which means are provided for adjustably pre-setting the fine-adjusting means for individual channels to be selected.

With increasing trend of the television broadcasting in UHF band, many types of UHF channel selecting devices have been developed.

These UHF channel selecting devices are required to select over a wide band, for example, 50 channels in Japan whereas 70 channels in U. S. A. For this reason, channel selecting devices designed for VHF systems covering a relatively small number of channels (12 channels in Japan) of which inductance elements are switched can not be used for UHF systems. Because inductance elements for signals of very high frequency as UHF have greatly different shape from those for use in VHF band so that it is difficult to obtain inductance elements of satisfactory electrical characteristics. Moreover, as it is necessary to use a great many inductance elements, for example, 50 or 70, the construction of the device for successively switching these inductance elements becomes complicated. Thus the channel selector of the conventional design is not suitable for signals of high frequency such as UHF.

For this reason, a continuous tuning system utilizing a variable capacitor has been used for UHF channel selecting devices.

In such a channel selecting device utilizing the continuous tuning system using a variable capacitor it is usual to interconnect the rotary shaft of the variable capacitor and the knob of the channel selector by means of a speed reduction transmission such as a gear train or a belt and pulleys thereby to obtain tuning by carefully rotating the knob for channel selection. This construction is identical to that of the tuning device for a radio receiver.

However, when such an UHF channel selecting device is used for an UHF television receiver, it is difficult to adjust the receiver at the most suitable receiving condition at each channel selection. Especially, in the case of a color television receiver, even a slight detuning may cause serious degradation in the color of the reproduced image.

Since reduction gear ratio between the channel selector knob shaft and the rotary shaft of the variable capacitor is large, it is necessary to note the knob in sufficient frequency to successively switch from one channel to another. This operation requires time and is inconvenient.

SUMMARY OF THE INVENTION

It is the principal object of this invention to provide an improved channel selecting device which can be operated readily in a short time.

Another object of this invention is to provide a channel selecting device which is rotated stepwisely to select a desired channel.

Still another object of this invention is to provide a novel channel selecting device wherein respective receiving channels are tuned precisely beforehand so as to obtain best receiving condition when they are selected.

A further object of this invention is to provide a channel selecting device which can be readily assembled with a minimum number of component parts.

According to this invention there is provided a channel selecting device comprising a channel selecting shaft, a channel selecting cylinder axially slidably mounted on the channel selecting shaft, said channel selecting cylinder having a helical cam surface on one side; means for stepwisely rotating the channel selecting shaft and the channel selecting cylinder; a plurality of circumferentially equally spaced apart fine tuning screws; fine tuning means for selectively operating one of the screws to move it in the axial direction thereof, means to be axially moved in accordance with the axial movement of the selectively operated fine tuning screw and with the circumferential displacement of the helical cam surface and means normally urged against one side surface of the channel selecting cylinder to follow the axial movement thereof.

A number of fine tuning screws are threaded through a disc on a circle close to the periphery thereof and the axial movement of the selected one of the screws is transmitted to the cylinder through a swinging arm. Alternatively these screws may be threaded in the bottom surface of the channel selecting cylinder.

DESCRIPTION OF THE PREFERRED EMBODIMENTS

Figure 1:
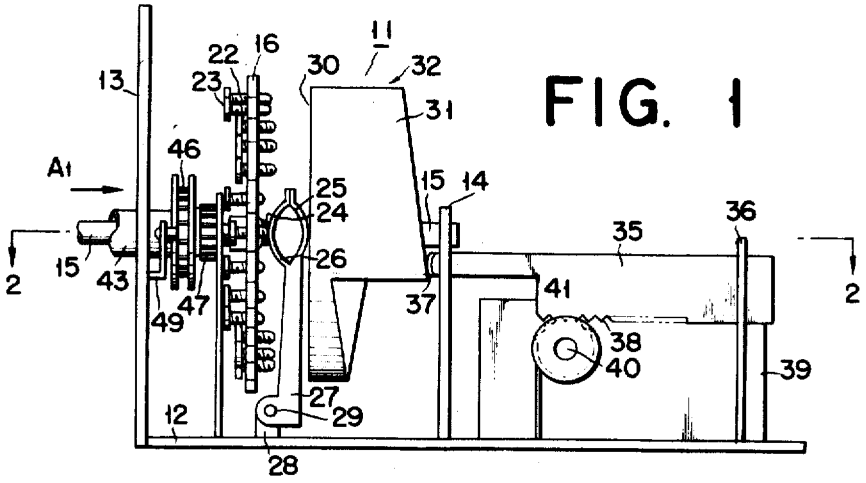
FIG. 1 is a side elevation of a channel selecting device embodying this invention.
Figure 2:
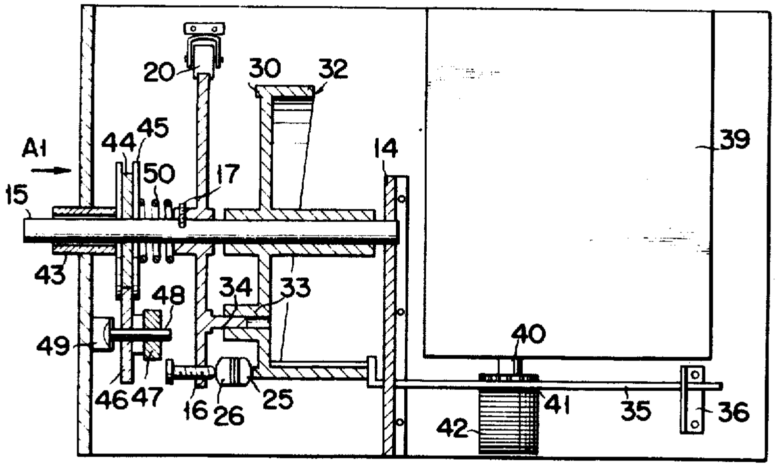
FIG. 2 shows a sectional view of the channel selecting device shown in FIG. 1 taken along a line 2—2 thereof.
Figure 3:
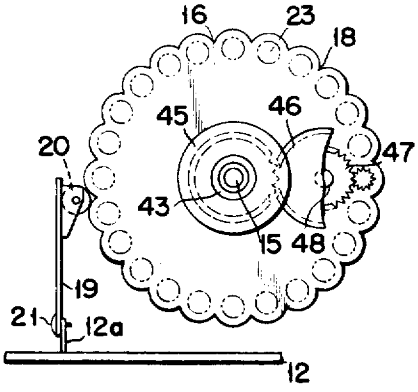
FIG. 3 is a front view of a disc of the channel selecting device shown in FIG. 1.

The channel selecting device 11 shown in FIGS. 1, 2 and 3 comprises a channel selecting shaft 15 rotatably supported by a front wall 13 and an intermediate supporting member 14. A rotary disc 16 is secured to shaft 15 by a set screw 17 to be rotated therewith. On the outer periphery of the rotary disc 16 are disposed at equal spacing a plurality of detent notches 18 with one of which is operatively engaged a detent roller 20 fitted to a leaf spring 19 for resiliently urging it against the notch. The lower end of the leaf spring 19 is secured to a tongue 12*a* stamped out from frame 12, by means of a screw 21. A predetermined number of fine tuning screws being equal to that of detent notches 18 are adjustably threaded through disc 16 on the peripheral portion thereof. One end of each fine tuning screw 22 is provided with a gear 23. Screws 22 are adjusted such that the other end of screws protrude from disc 16 by different axial lengths which vary gradually, as shown in FIG. 1. The other end of the fine tuning screw 22 is contacted with the portion 24 on the outer surface of an arcuate contact piece 26 of a swinging arm 27 which has another arcuate contact piece 25 opposite to the piece 26. The lower end of the swinging arm 27 is pivotally mounted on a pair of supporting tongues 28 upwardly bent from the frame 12, by means of a pin 29. Thus the swinging arm 27 is rotated about pin 29 to move the pieces 25 and 26 in the axial direction of the fine tuning screw 22 in accordance with the protruding length thereof from disc 16. The piece 25 is urged against a flat circular surface 30 at the bottom of a channel selecting cylinder 32 having a helical cam surface 31 and slidably mounted on channel selecting shaft 15. Channel selecting cylinder 32 is made of suitable material such as acetal resin, aluminum or zinc. The bottom surface of the channel selecting cylinder is formed with a hollow guide cylinder 33 projecting towards disc 16 to receive a pin 34 projecting therefrom, as best shown in FIG. 2. With this construction, the channel selecting cylinder 32 is moved axially along channel selecting shaft 15 in accordance with the angle of rotation of the arm 27 about pin 29. When shaft 15 is rotated, cylinder 32 is rotated together with disc 16 by the engagement of pin 34 and guide cylinder 33.

As shown in FIGS. 1 and 2, a rack plate 35 is slidably supported by and between intermediate supporting frame 14 and a rear supporting plate 36. Rack plate 35 is provided with a sidewardly bent projection 37 having an arcuate section at its outer end and a series of rack teeth 38 on its bottom edge. The projection 37 engages the helical cam surface 31 while rack teeth engage a gear 41 mounted on a rotary shaft 40 of an UHF tuner 39 including a variable tuning capacitor, not shown. A coil spring 42 whose one end is engaged with frame 12 is wound about rotary shaft 40 of the UHF tuner 39 to normally urge projection 37 against cam surface 31. Thus, the rack plate 35 is reciprocated in accordance with the circumferential displacement of the helical cam surface 31 of the channel selecting cylinder 32, thus rotating the rotary shaft 40 of the tuner 39, which may be of any well known construction to select a channel of the desired frequency.

A fine tuning sleeve 43 fits over channel selecting shaft 15 to be rotatable and slidable axially relative thereto. On the inner end of sleeve 43 is secured a gear 44 which is clamped between a pair of guide discs 45. An idler gear 46 meshing with gear 44 is carried by a shaft 48 which also carries a gear 47 adapted to selectively engage one of the gears 23 of the fine tuning screws 22. Shaft 48 is rotatably supported by a support 49 secured to front wall 13.

Gear 47 is caused to selectively engage gear 23 of a selected fine tuning screw 22 when fine tuning sleeve 43 is pushed inwardly as shown by arrow $A_1$, but is normally urged outwardly by a spring 50 to disengage gear 47 from gear 23.

The channel selecting device described above operates as follows:

Rotation of the channel selecting shaft 15 results in the stepwise rotation of disc 16 and channel selecting cylinder 32 to cause cylinder 32 to move axially through swinging arm 27 over a distance corresponding to the protruded length of fine tuning screws 22. Accordingly the rack plate 35 is moved in the longitudinal direction by an amount corresponding to the circumferential displacement of the helical cam surface 31 of cylinder 32. Longitudinal movement of rack plate 35 rotates shaft 40 through gear 41 meshing with rack 38 to select the desired channel by UHF tuner 39. Inclination of the cam surface 31 is determined such that rotation of shaft 40 which is stepwisely driven by channel selecting shaft 15 selects desired channel. Actually, however, due to the difference between the angle of rotation of tuner shaft 40 and respective receiving channels and inaccurate configuration of the helical cam surface 31, the shaft 40 is not always moved to the correct switching positions of the receiving channels. To bring tuner shaft 40 to correct switching positions above described fine tuning means is used.

More particularly, fine tuning sleeve 43 is pushed inwardly against the force of spring 50 to mesh gear 47 with a selected one of gears 23 of tuning screws 22. Then the sleeve 43 is rotated to drive a gear 23 through gears 44, 46 and 47, thus moving selected screw 22 in the axial direction of disc 16. This motion is transmitted to rack plate 35 through swinging arm 27 and channel selecting cylinder 32 to slightly rotate the shaft 40 of UHF tuner 39.

When such adjustment is made for respective receiving channels, each time the channel selecting shaft 15 is rotated one step, the desired receiving channel can be selected at high accuracy thus always providing the best receiving condition.

Figure 4:
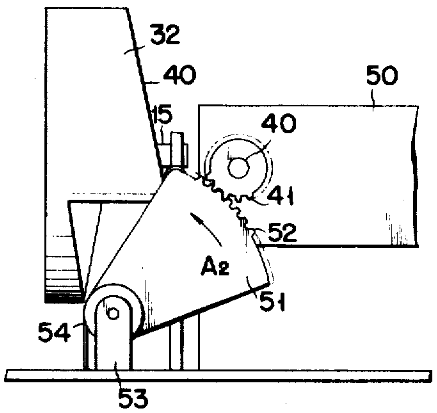
FIG. 4 is a side view of a modified movable arm mechanism utilized in this invention.

As shown in FIG. 4, a sector gear 51 may be used instead of rack plate 35 to drive tuner shaft 40. The sector gear 51 is provided with teeth 52 meshing gear 41 and the lower end of sector gear 51 is pivotally mounted on a support 53 of frame 12. Sector gear 51 is normally biased in the counterclockwise direction as shown by arrow $A_2$ by means of a spring 54.

Figure 5:
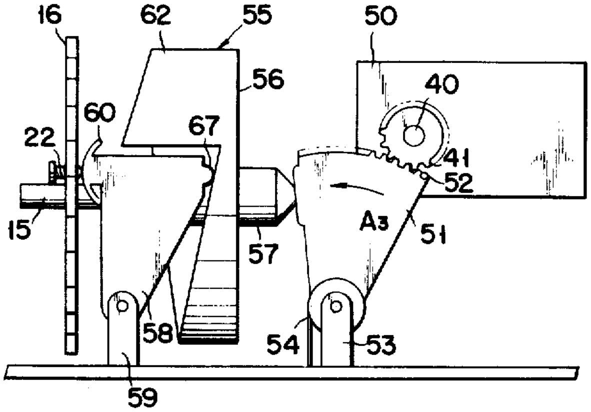
FIG. 5 shows a partial side view of still another embodiment of this invention utilizing different arrangement of the channel selecting cylinder.

FIG. 5 shows another modification of this invention wherein the direction of channel selecting cylinder 55 is reversed from that shown in the previous embodiment. Cylinder 55 is formed with a coaxial extension 57 on the bottom surface 56 and is slidably mounted on channel selecting shaft 15. A triangular arm 58 pivotally mounted on a support 59 of frame 12 is disposed between disc 16 and cylinder 55. An arcuate segment 60 is secured to the upper end of arm 58 to engage top end of fine tuning screws 22, whereas an arcuate projection 61 engaging helical cam surface 62 is projected from the opposite upper side of arm 58. The extreme end of extension 57 engages one side of the sector gear 51 to rotate tuner shaft 40. Remaining portions of this embodiment are constructed similar to the previous embodiment. In this modification the axial movement of the fine tuning screws 22 is transmitted to tuner 50 via triangular arm 58, channel selecting cylinder 55 and sector gear 51 to select the desired channel.

Figure 6:
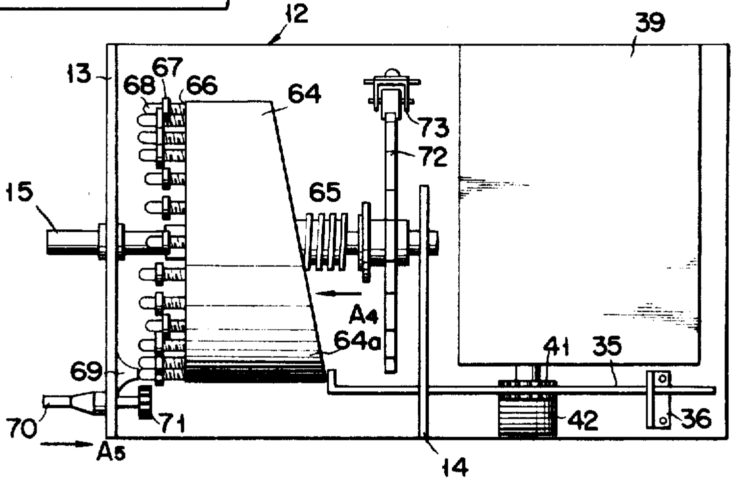
FIG. 6 shows a top view of another embodiment of this invention utilizing a channel selecting cylinder with a fine tuning screw.

In another embodiment shown in FIG. 6, fine tuning screws 66 are mounted on the channel selecting cylinder 64. More particularly, a channel selecting shaft 15 is rotatably supported by and between front wall 13 of frame 12 and an intermediate supporting member 14 and a channel selecting cylinder 64 is axially slidably mounted on shaft 15, cylinder 64 being normally biased in the direction of arrow $A_4$ by means of spring 65 interposed between cylinder 64 and a flange on the sleeve. A plurality of fine tuning screws 68 are threaded into the periphery of the bottom 66 of cylinder 64. As shown by an enlarged view shown in FIG. 7 each fine tuning screw 66 consists of a gear 67 secured at substantially the middle portion of screw 66 with a rounded head 68 at the top end thereof. A frustum projection 69 is secured on the inner side of front wall 13 to engage head 68 of one screw 66. Head 68 reaches the top of frustum projection by moving along the inclined surface thereof. A fine tuning shaft 70 freely extends through front wall 13 adjacent frustum projection 69 to support a gear 71 adapted to mesh gear 67 of the selected fine tuning screw 66. Fine tuning shaft 70 is normally maintained in the position shown by means of spring (not shown) so that when shaft 70 is depressed inwardly in the direction of arrow $A_5$ gear 71 is caused to engage gear 67 of one of screws 66 to effect fine adjustment thereof. Upon release, shaft 70 is restored to the original position.

A disc 72 of the configuration to rotate stepwisely with shaft 15 is secured to shaft 15 on the rear side of channel selecting cylinder 64, by mean of a screw. The periphery of disc 72 has a plurality of detent notches like disc 16 shown in FIG. 3 to cooperate with a detent roller 73. Other mechanisms positioned to the rear of cylinder 64 are identical to those shown in FIGS. 1 to 3 or FIG. 4.

Channel selecting shaft 15 is rotated stepwisely under the control of detent roller 73 to select a desired television channel. This shaft also causes cylinder 64 to rotate stepwisely to move it axially corresponding to the protruding length of a screw 66 engaging projection 69 at this time. As cylinder 64 is rotated, the circumferential displacement of helical cam surface 64*a* causes rack 35 to slide in the longitudinal direction by an amount corresponding to the sum of the protruding length of the fine tuning screw 66 and the axial displacement of the operating point of helical cam surface 64*a* caused by the rotation thereof. The longitudinal movement of rack 35 rotates the shaft 40 of tuner through gear 41 to operate UHF tuner 39.

Figure 7:
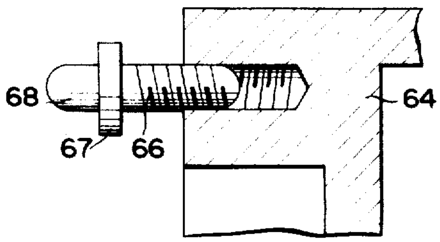
FIG. 7 is a pertial sectional view showing the manner of mounting the fine tuning screw of the embodiment shown in FIG. 6.

To adjust respective receiving channels to the best operating condition, fine tuning shaft 70 is depressed to the right to cause gear 71 to engage gear 67 on a screw 66 and then shaft 70 is rotated. After this adjustment by the rotation of shaft 15, it is possible to select a desired channel which is always adjusted to the best operating condition. In the embodiment of FIG. 7, rack may be sector gear as shown in FIG. 4.

Figure 8:
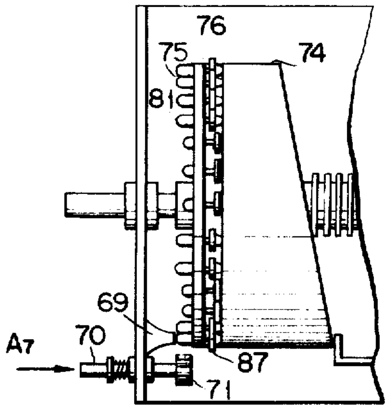
FIG. 8 shows a partial top view of another embodiment of this invention utilizing a channel selecting cylinder with a fine tuning screw.
Figure 9A:
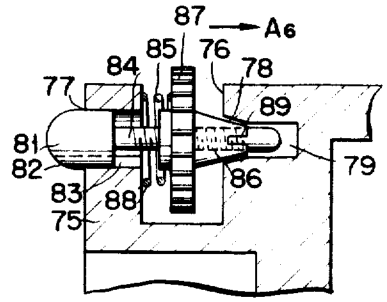
FIG. 9A shows a partial sectional view showing the manner of mounting the fine tuning screw shown in FIG. 8.
Figure 9B:
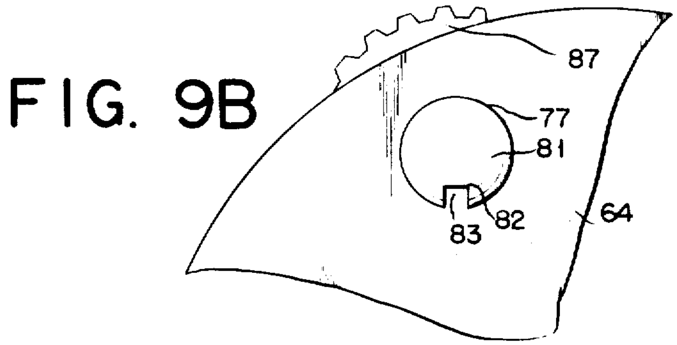
FIG. 9B is a partial front enlarged view of the fine tuning screw shown in FIG. 9A.

FIG. 8 shows a modified embodiment of this invention wherein the channel selecting cylinder is provided with a plurality of fine tuning screws like the embodiment shown in FIG. 6. More particularly, as shown in FIGS. 9A and 9B, on the periphery of channel selecting cylinder 74, there is provided an annular groove 76 near the bottom surface 75, and a plurality of equally spaced apart axial openings 77 are formed in the bottom surface 75 to reach groove 76, the number of the openings 77 being equal to the number of channels. On the opposite side surface of groove 76 are provided a plurality of frusto-conical holes 78 and cylindrical holes 79 connected to the apieces of frusto-conical holes, these holes 78 and 79 being coaxial with respective openings 77. Each set of openings 77 and holes 78 and 79 receives a fine tuning screw 80 comprising a rounded head 81 slidably received in opening 77 and formed with a key way 82 which receives a key 83 to prevent rotation of head 81. Head 81 is coaxially mounted on a stem 84 having screw threads 85 on its outer periphery and a frusto-conical member 86 is threaded on stem 84 to engage frusto-conical hole 78. A gear 87 adapted to engage gear 71 on the fine tuning shaft 70 is secured to the base of the frusto-conical member 86. The diameter of gear 87 is selected such that its periphery formed with teeth protrudes beyond the peripheral surface of the channel selecting cylinder 74. A spring 88 is interposed between gear 87 and one side surface of annular groove 76 to normally urge conical member 86 to engage the wall of the frusto-conical hole 78. Accordingly, as the frusto-conical member 86 is rotated through gear 87, head 81 of fine tuning screw 80 is moved in the axial direction. A plurality of axial slots 89 are formed on the inner end of the frusto-conical member 86 to decrease the diameter of this end when frusto-conical member 86 is forced into hole 78 by the spring 88 to firmly clamp stem 84. For this reason, once set, the fine tuning screw 80 is firmly held in the set position against vibration and backlash of screw threads 85 to firmly hold stem 84.

In this embodiment, fine tuning is performed by depressing shaft 70 in the direction of arrow $A_7$ as shown in FIG. 8 to cause gear 71 to engage one of the gears 87, and then rotating shaft 70. Once respective channels have been adjusted to their best operating conditions in this manner, any desired channel can be selected by mere rotation of channel selecting shaft 15. Further as each fine tuning screw 80 is supported by its head 81 and frusto-conical member 86, fine and accurate adjustment of the screw can be assured.

Figure 10:
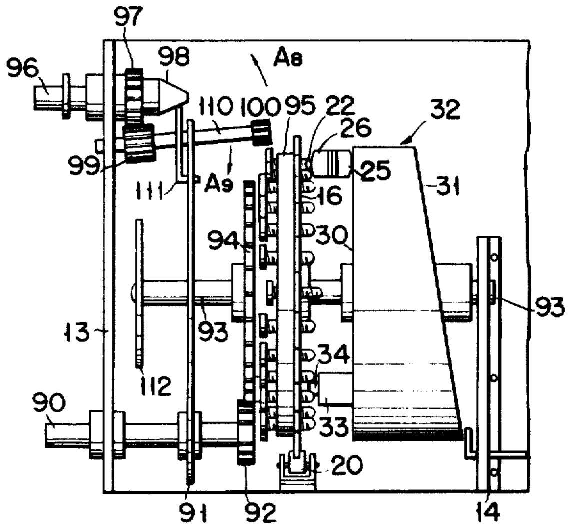
FIG. 10 shows a partial top view of another embodiment of this invention utilizing a channel selecting shaft with a reduction gear.

FIG. 10 shows still further modification of this invention including a channel selecting shaft of improved construction. Channel selecting shaft 90 is rotatably supported by front wall 13 and a supporting member 91 and carries a main gear 92 on its inner end. The main gear 92 meshes a follower gear 94 of larger diameter and is secured to a follower shaft 93 supported by supporting members 91 and 14 in parallel with shaft 90. A disc 95 is mounted on shaft 93. A disc 16 is secured on the back of disc 95 to be stepwisely rotated by channel selecting shaft 90. A plurality of equally spaced apart fine tuning screws 22 are threaded through both discs 95 and 16 on the peripheral portion thereof. The stepwise rotation of shaft is provided by detent notches 18 (see FIG. 3) on the periphery of disc 16 and a detent roller 20 engaging with one of the notches. A channel selecting cylinder 32 is rotatably and axially slidably mounted on follower shaft 93 on the rear side of disc 16. Bottom 30 of cylinder 32 is provided with a hollow cylinder 33 to receive a pin 34 secured to the rear side of disc 16 so that when disc 95 is rotated, cylinder 32 will be rotated therewith. The top end of screw 22 engages an arcuate contact piece 26 on the upper end of a swinging arm 27 which is identical to that shown in FIG. 1 and carries another piece 25 engaging the bottom surface 30 of cylinder 32.

A fine tuning shaft 96 is supported for axial movement on the front wall 13 and has a gear 97 and a tapered end 98 on the inner side of the front wall 13. A shaft 110 is journaled in the proximity of the shaft 96 by the front wall 13 and an auxiliary supporting member 111 is movably supported on the supporting member 91, the top of which is normally biased to engage the tapered end 98 by means of a spring, not shown. The shaft 110 includes a gear 99 engaged with the gear 97 and a gear 110 mounted on the rear end of the shaft 110 and operatively engaged with the gear 23 of the fine tuning screws 22. In such a construction, the axial movement of the fine tuning shaft 96 causes the shaft 110 to swing in the direction A8 and A9, the depression of the shaft 96 causes the shaft 110 to move in the direction A9, thereby engaging the gear 100 with the gear 23.

In the embodiment shown in FIG. 10a shaft 90 is rotated to drive shaft 93 through gears 92 and 94, supporting disc 95 with fine tuning screws 22 is rotated stepwisely to axially move cylinder 32 by a distance corresponding to the protruding length of the screw 22. At this time since cylinder 32 is rotated in unison with disc 95 the operating point of helical cam surface 31 is also displaced in the circumferential direction. A motion corresponding to the sum of the protruding length of screw 22 and the displacement of cam surface 31 is transmitted to tuner shaft 40 to select a desired channel. Fine adjustment of each channel is provided by the depression and rotation of fine tuning shaft 96. More particularly, upon depression of shaft 96 auxiliary supporting member 111 will be pushed to the right as viewed in FIG. 10 by the tapered portion 98 to move gear 100 into engagement with gear 23. Thus when shaft 96 is rotated after engagement of gears 100 and 23, screw 22 is displaced axially to perform fine adjustment of the tuning point.

The embodiment shown in FIG. 10 is advantageous in that it is possible to switch channels through large switching angle of shaft 90 by the proper selection of the reduction gear ratio between gears 92 and 94. For example, with a reduction gear ratio of 3, all channels can be switched by three turns of shaft 90. Selection of respective channels can be indicated by a display board 112 on follower shaft 93.

In all embodiments, not only the channel selecting cylinders but also other components can be made of suitable hard resins.

What we claim is:

1. A channel selecting device comprising a frame provided with a front wall and a supporting member; a channel selecting shaft extending between said front wall and said supporting member and rotatably supported thereby; means for stepwisely rotating said channel selecting shaft; a channel selecting cylinder slidably mounted on said channel selecting shaft, said cylinder having a bottom surface and a helical cam surface; a plurality of fine tuning screws carried by the bottom surface of said channel selecting cylinder at equal circumferential spacings, each of said screws having a head and a gear; a projection projecting from the inside of said front wall to engage said head of one of said screws; a fine tuning shaft having a gear which is brought into engagement with said gear of said one screw when said fine tuning shaft is depressed, the tuning of said fine tuning shaft is depressed, the turning of said fine tuning shaft engaging with said one screw causing said screw to rotate to adjust the length of protrusion thereof; movable means movable in accordance with the variation of the protruded length of said fine tuning screw and the variation in the operating point of said helical cam surface caused by the rotation of said cylinder; means for urging said movable means against said cylinder; and a tuner operated by the movement of said movable means.

2. The channel selecting device according to claim 1 wherein said channel selecting cylinder comprises an annular groove provided on the other periphery near the bottom of said cylinder, a plurality of openings extending from said bottom to said groove, the number of said openings being equal to the number of said fine tuning screws, and keys in said openings, and a frusto-conical hole and a contiguous cylindrical hole provided on the opposite side wall of said groove to oppose each of said through openings, and each of said fine tuning screws comprises a key way formed in said head to receive said key, a threaded stem connected to said head, an internally threaded frusto-conical member threaded on said threaded stem and gear mounted on said frusto-conical member, said gear having a diameter such that the gear extends beyond the periphery of said channel selecting cylinder, said heads being received in said through openings to be movable in the axial direction, said frusto-conical member being received in said frusto-conical hole, and spring means interposed between said gear and one side wall of said grooves to urge said screw to force said frusto-conical member into said frusto-conical hole.

3. The channel selecting device according to claim 1 including detent means for the stepwise rotation comprising disc mounted on said selector shaft, a plurality of detent notches equally spaced around the periphery of said disc, the number of said notches being equal to the number of said fine tuning screws; and a detent wheel yieldingly urged against said detent notches.

4. The channel selecting device according to claim 1 wherein said fine tuning screws are screwed respectively to a plurality of screwed holes bored in said channel selecting cylinder.

5. A channel selecting device comprising a channel selecting shaft; detent means for imparting stepwise rotation to said channel selecting shaft; a disc mounted on said shaft to rotate therewith; a plurality of fine tuning screws screwed adjustably to said disc at equal circumferential spacings; fine tuning means connectable with one of said screws to rotate and axially move the same; a channel selector cylinder including a helical cam surface and a flat circular surface and mounted on said selector shaft to be slidable in the axial direction, a movable arm positioned between said channel selecting cylinder and said one screw operatively connected to said fine tuning means; movable means movable in accordance with the axial movement of said one screw and the displacement of the operating point of said helical cam surface caused by the rotation of said channel selecting cylinder; biasing means to urge said movable means against said channel selecting cylinder; and a tuner having a shaft operated by said movable means.

6. The channel selecting device according to claim 5 wherein each of said fine tuning screws includes a gear mounted on one end, and said fine tuning means comprises a fine tuning shaft coaxially mounted on said channel selecting shaft to be rotatable and slidable in the axial direction, means to normally bias said fine tuning shaft away from said disc, a first gear mounted on said fine tuning shaft, a second gear meshing said first gear and movable with said fine tuning shaft, and a third gear mounted on the same shaft as said second gear and engageable with the gear of one of said gears of said fine turning screws when said fine tuning shaft is moved axially.

7. The channel selecting device according to claim 5, wherein said movable means comprises an elongated rack having a bent up projection at one end, said projection engaging said cylinder and said rack meshing a gear on the rotary shaft of said tuner. 8. The channel selecting device according to claim 5 wherein said channel selecting cylinder is mounted on said channel selecting shaft with said flat surface opposed to said disc, and said movable arm has two arcuate members engaging said flat surface of said cylinder and said one screw, respectively.

9. The channel selecting device according to claim 5 wherein said detent means for imparting said stepwise rotation comprises a plurality of detent notches spaced around the periphery of said disc, the number of detent notches being equal to the number of said fine tuning screws, and a detent wheel yieldingly urged against said detent notches.

10. The channel selecting device according to claim 5 wherein said channel selecting cylinder is mounted on said channel selecting shaft with said helical cam surface opposed to said disc and provided with an axial projection projecting from said cylinder at said flat surface side, said movable arm is a triangle movable arm having an arcuate member engaging said helical cam surface on the other side.

11. The channel selecting device according to claim 5 wherein said movable means is a sector member having one portion urging against said cylinder and a rack provided on the arcuate portion thereof, said rack meshing a gear on the rotary shaft of said tuner.

12. A channel selecting device comprising a frame including a front wall and supporting member; a channel selecting shaft extending between and rotatably supported by said front wall and said supporting member; reduction gear means associated with said channel selecting shaft; a driven shaft connected to said reduction gear means; a disc mounted on said driven shaft; a plurality of circumferentially and equally spaced apart fine tuning screws provided along the periphery of said disc; a first gear mounted on one end of each of said fine tuning screws; a fine tuning shaft coupled operatably to one of said fine tuning screws to axially move it; a means for stepwisely rotating said channel selecting shaft; a channel selecting cylinder rotatably and axially slidably mounted on said driven shaft, said cylinder rotating in unison with said disc and having a bottom surface and a helical cam surface; movable means displaced in accordance with the axial movement of said cylinder and the circumferential displacement of said helical cam surface, means for urging said movable means against said cylinder; and a tuner having a rotary shaft rotated in accordance with the movement of said movable means.

13. The channel selecting device according to claim 12 wherein said reduction gear means comprises a driving gear mounted on said selecting shaft and a driven gear mounted on said driven shaft to mesh said first gear, said driven gear having larger diameter than said driving gear.

* * * * *